April 14, 1936.  C. L. HALL  2,037,682

FASTENING INSTALLATION AND FASTENER THEREFOR

Filed Jan. 15, 1935

Inventor:
Charles L. Hall,
by Walter S. Jones
Atty.

Patented Apr. 14, 1936

2,037,682

UNITED STATES PATENT OFFICE 2,037,682

FASTENING INSTALLATION AND FASTENER THEREFOR

Charles L. Hall, Detroit, Mich., assignor to United-Carr Fastener Corporation, Cambridge, Mass., a corporation of Massachusetts Application January 15, 1935, Serial No. 1,973

5 Claims. (Cl. 45—138)

My invention aims to provide improvements in fastener-secured trimming and the like installations, and fasteners therefor.

In the drawing, which illustrates a preferred embodiment of my invention:—

One object of my invention is to provide an improved method of securing covering materials to supporting structures. A further object of my invention is to provide a means of insuring secure engagement for the extreme edges of panels used in installations where there is some obstruction preventing the use of the ordinary types of fasteners near the edge of the panel. Such installations include the attachment of the so-called head-linings of motor vehicle bodies, and other assemblies where it is not feasible to provide apertures near the edge of the support.

Figure 1:
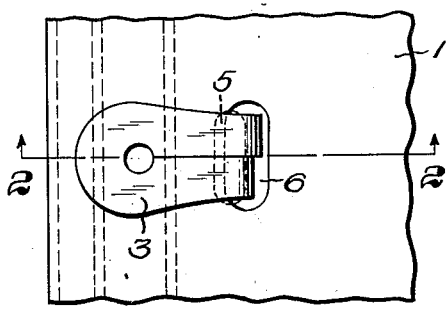
Figure 1 is a plan view of a portion of an installation embodying the principle of my invention.
Figure 2:
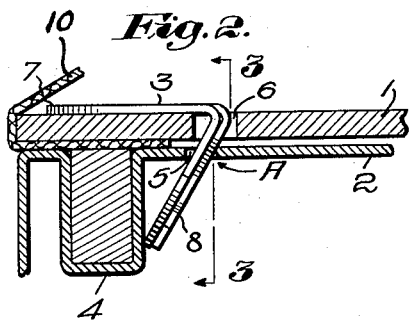
Fig. 2 is a section taken on the line 2—2 of Figure 1.
Figure 3:
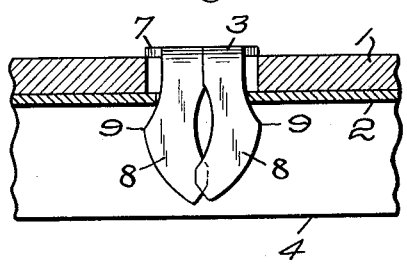
Fig. 3 is a section taken on the line 3—3 of Fig. 2.
Figure 4:
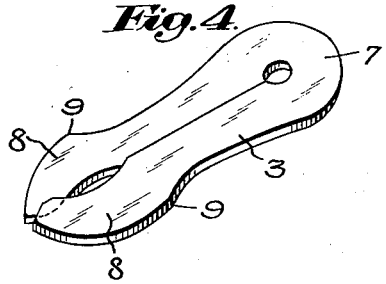
Fig. 4 is a perspective view of the blank used in making the fasteners.
Figure 5:
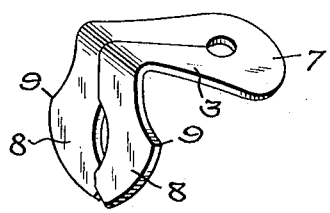
Fig. 5 is a perspective view of the finished fastener.

Referring now to the drawing, I have shown (Figs. 1-3) the essential parts of an installation illustrating the principle of my invention. The installation includes a covering panel 1, of relatively rigid material such as cardboard, fibreboard and the like, a portion of a metal frame member 2, and a fastener member 3. The frame member has a projecting portion 4 extending along its edge, which would ordinarily prohibit the use of snap fastener members, but which is an important factor in my invention. The frame 2 is provided with a series of oval apertures 5 (Fig. 1) spaced from the projection 4 and the panel 1 is provided with a corresponding series of apertures 6, partially overlying the apertures 5.

The fastener member, generally designated by the numeral 3, is preferably formed from strong spring metal and has a head 7, a pair of laterally yieldable arms 8, and a shoulder 9 on each arm. The arms 8 are arranged in offset relation so that they may move toward and away from each other in the manner of scissors. The fastener is generally V-shaped in form: one leg comprising the head portion 7, and the arms 8 forming the second leg.

In order to clarify the principle upon which my invention operates, I shall now proceed with an account of the manner in which it is used. The panel 1, if not covered, is first placed upon the frame 2 with the corresponding apertures 5 and 6 in alignment. If the panel is covered, as by a flexible material, such as cloth 10 (Fig. 2), then the fasteners are preassembled therewith and the whole is then engaged as in the usual manner of upholstery assemblies. The arms 8 of the fastener are then inserted in the apertures with the head portion 7 pointing toward the edge of the panel 1. The arms are pushed through the apertures until their upper ends bear against the frame 2 at "A" (Fig. 2) and their free ends bear against the projection 4. At this point the shoulders 9 will still be above the frame 2. The angle of the yieldable part of the fastener with respect to the point "A" and the side of the projection 4 is such that there is a tendency to straighten the yieldable portions as the fastener is forced further through the apertures. Thus the frame 2 acts as a fulcrum at "A" and the straightening action causes the head 7 of the fastener to bear down hard on the cover 1. In this last position, while the head is exerting the maximum pressure on the cover, the shoulders 9 engage the sides of the aperture in the framework and the cover is securely held in place. The particular advantage of this type of fastening is that the holding means, i. e. the head of the fastener, exerts its power very near the edge of the covering panel, which is a much desired result, and one not easily obtained with the ordinary types of fasteners previously in use.

While I have illustrated and described a preferred form of my invention I do not wish to be limited thereby as the scope of my invention is best defined by the following claims.

I claim:

1. An installation of the class described comprising, in combination, a supporting structure having an aperture therethrough, a substantially rigid projection extending from one side of said supporting structure between the edge thereof and said aperture, a covering member of relatively rigid material overlying said support at the side thereof opposite from said projection, said cover having an aperture cooperating with the aperture in said support, and a fastener member having a head portion bearing on the outer surface of said cover, yieldable means extending from said head through said apertures and bearing against one side wall of the aperture in said support, and the extremities of said yieldable means bearing with a spring tension against the projection of said support, the engagement of the extremities of said yieldable means with said projection tending to rock said fastener about the apertured supporting structure as a fulcrum to cause the head portion to be forced against said cover.

2. An installation of the class described comprising, in combination, superposed members to be fastened together, each of said members having an aperture, a projection extending from the first of said members at the side thereof away from the second member, and a V-shaped fastener member to secure said members together, one leg of said fastener extending through said apertures and the free end thereof bearing against said projection thereby forcing another portion of the leg against the first of the members to be fastened together and causing the free end of the second leg of the fastener to bear upon the first member whereby the two members are secured together.

3. An installation of the class described comprising, in combination, superposed members to be fastened together, each of said members having an aperture, a projection extending from the first of said members at the side thereof away from the second member, and a V-shaped fastener member to secure said members together, one leg of said fastener extending through said apertures and the free end thereof bearing against said projection thereby forcing another portion of the leg against the first of the members to be fastened together and causing the free end of the second leg of the fastener to bear upon the first member and means provided by the first leg of the fastener to engage the second member and maintain the fastener in engaged position, whereby the two members are secured together.

4. An installation of the class described comprising, in combination, a supporting structure having an aperture therethrough, a substantially rigid projection extending from one face of said supporting structure adjacent to said aperture, a covering member superposed on said support at the side opposite said projection, said cover having an aperture overlying the aperture in the support, and a sheet metal fastener of substantially V-shaped longitudinal cross-section securing said members together, one leg of said V-shaped fastener comprising a pair of movable arms, said arms passing through said apertures and the free ends thereof bearing against said projection, shoulders provided by said arms engaging the material of said supporting structure adjacent to the aperture therethrough to maintain the fastener in position, and the other leg of said fastener bearing on the outer surface of the cover to hold the cover to said support.

5. An installation of the class described comprising, in combination, a supporting structure having a rib extending along one edge thereof, said rib presenting at least one rigid surface disposed substantially at right angles to the plane of said supporting member, said supporting member having a plurality of apertures therethrough spaced at equal distances from said rib, a covering member overlying said support at the side thereof opposite to said rib and extending to the extreme edge of said support, said cover having apertures in alignment with apertures in said support, and a plurality of individual sheet metal fasteners securing said cover to said support, each of said fasteners being substantially V-shaped in longitudinal cross-section and having the free end of one leg located at the outer surface of said cover adjacent to the edge thereof and the second leg of each fastener extending through one set of apertures, said second leg comprising a pair of laterally yieldable spring arms having oppositely disposed shoulders engaging said support and the free ends of said arms bearing against the rigid face of said rib whereby the first leg of each fastener is urged against the cover to hold it in place.

CHARLES L. HALL.